(12) United States Patent
Iida et al.

(10) Patent No.: US 12,474,001 B2
(45) Date of Patent: Nov. 18, 2025

(54) FLUID DEVICE COUPLER AND FLUID DEVICE COUPLING STRUCTURE

(71) Applicants: YODOGAWA HU-TECH CO., LTD., Suita (JP); CKD CORPORATION, Komaki (JP)

(72) Inventors: Masao Iida, Suita (JP); Hiroki Iwata, Komaki (JP)

(73) Assignees: YODOGAWA HU-TECH CO., LTD., Osaka (JP); CKD CORPORATION, Aichi (JP)

( * ) Notice: Subject to any disclaimer, the term of this patent is extended or adjusted under 35 U.S.C. 154(b) by 17 days.

(21) Appl. No.: 18/563,553

(22) PCT Filed: Mar. 31, 2022

(86) PCT No.: PCT/JP2022/016840
§ 371 (c)(1),
(2) Date: Nov. 22, 2023

(87) PCT Pub. No.: WO2022/264658
PCT Pub. Date: Dec. 22, 2022

(65) Prior Publication Data
US 2024/0360927 A1  Oct. 31, 2024

(30) Foreign Application Priority Data
Jun. 17, 2021 (JP) ................. 2021-100728

(51) Int. Cl.
*F16L 23/16* (2006.01)
*F16L 23/04* (2006.01)
(Continued)

(52) U.S. Cl.
CPC ............. *F16L 23/162* (2013.01); *F16L 23/04* (2013.01); *F16L 37/088* (2013.01); *F16L 37/1225* (2013.01)

(58) Field of Classification Search
CPC ......... F16L 23/162; F16L 23/04; F16L 23/06; F16L 37/1225; F16L 37/088; F16L 37/08; F16L 21/06
See application file for complete search history.

(56) References Cited

U.S. PATENT DOCUMENTS 5,620,210 A  * 4/1997  Eyster ................. F16L 23/04
5,842,450 A  * 12/1998 Fort ................... F16L 37/1225
(Continued)

FOREIGN PATENT DOCUMENTS

CN     210686525 U    6/2020
JP     2006-242378 A  9/2006
(Continued)

OTHER PUBLICATIONS

Japan Patent Office "International Search Report" for corresponding International Application No. PCT/JP2022/016840, mailed Jun. 21, 2022, 6 pp.

*Primary Examiner* — William S. Choi
(74) *Attorney, Agent, or Firm* — Eckert Seamans Cherin & Mellott, LLC

(57) ABSTRACT

The present invention provides a fluid device coupler which can achieve satisfactory workability while saving space without reducing sealing performance, wherein the fluid device coupler comprises a coupling base having a depressed part at least partially curved in an arc shape, a first end edge side and a second end edge side continuous with an inner surface of the depressed part, and an opening portion formed between the first end edge side and the second end edge side a blockage member protrudable from the first end edge side toward the second end edge side and retractable in a circumferential direction from the second end edge side toward the first end edge side, and a sliding structure configured to slidably move the blockage member (Continued)

toward the second edge side of the coupling base without changing a distance radially from the coupling base.

21 Claims, 9 Drawing Sheets

(51) Int. Cl.
    *F16L 37/088*     (2006.01)
    *F16L 37/12*     (2006.01)

(56) References Cited

U.S. PATENT DOCUMENTS

| | | |
|---|---|---|
| 2006/0049634 A1* | 3/2006 | Goodsel .............. F16L 37/1225 |
| 2006/0191111 A1 | 8/2006 | Pearson et al. |
| 2009/0091125 A1 | 4/2009 | Takeda et al. |
| 2009/0208277 A1* | 8/2009 | Werth .................... F16L 23/04 |
| 2012/0227221 A1* | 9/2012 | Whitaker ............ F16L 37/1225 |
| 2013/0207389 A1 | 8/2013 | Rigollet |
| 2015/0008663 A1 | 1/2015 | Drivon et al. |
| 2017/0292643 A1 | 10/2017 | Prevot et al. |
| 2018/0156362 A1 | 6/2018 | Takeda et al. |

FOREIGN PATENT DOCUMENTS

| | | |
|---|---|---|
| JP | 2009-103303 A | 5/2009 |
| JP | 2013-540953 A | 11/2013 |
| JP | 2017-190869 A | 10/2017 |
| JP | 2018-091482 A | 8/2018 |
| JP | 3219049 U | 10/2018 |
| JP | 3226054 U | 4/2020 |
| JP | 2021-25608 A | 2/2021 |

* cited by examiner

[FIG. 1]
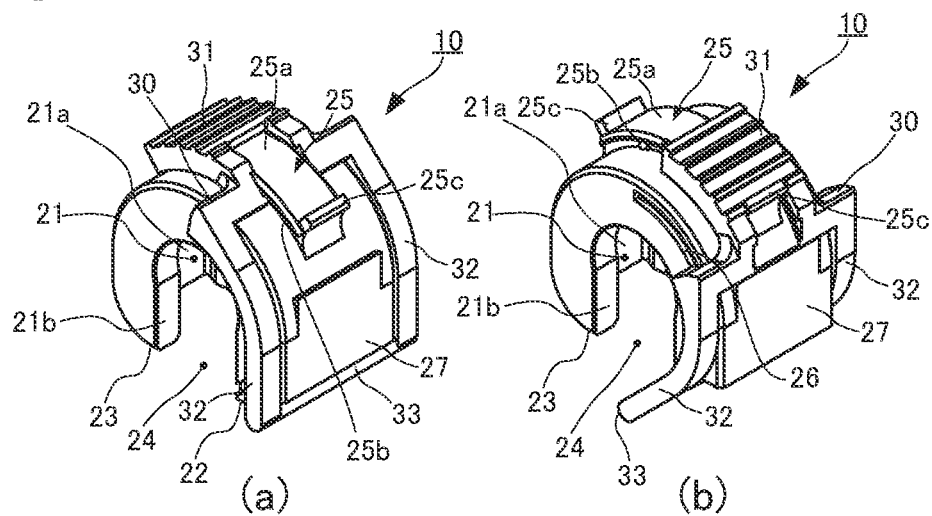
[FIG. 2]
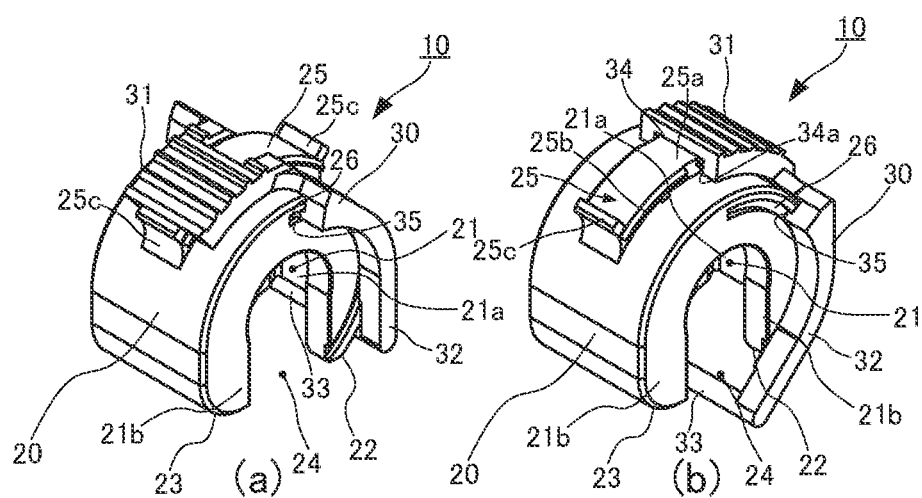

[FIG. 3]
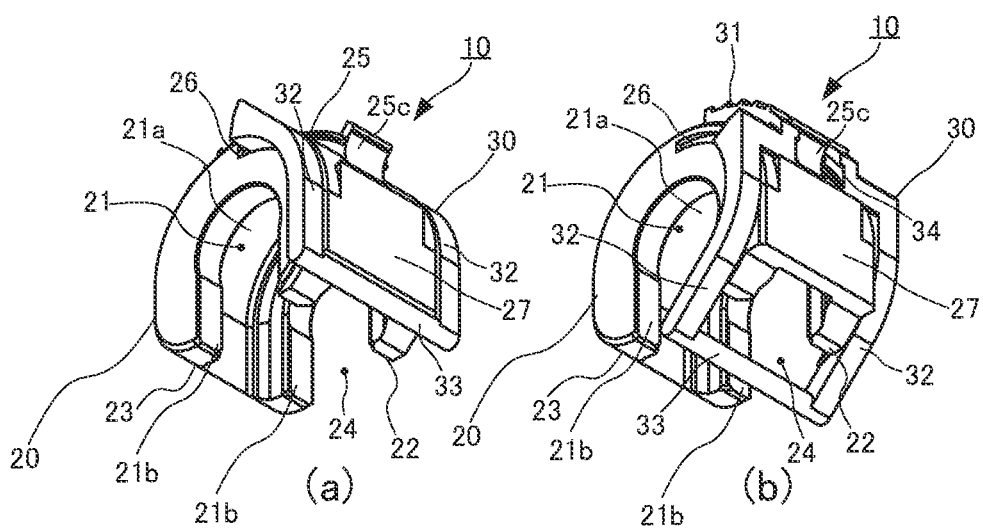

[FIG. 4]
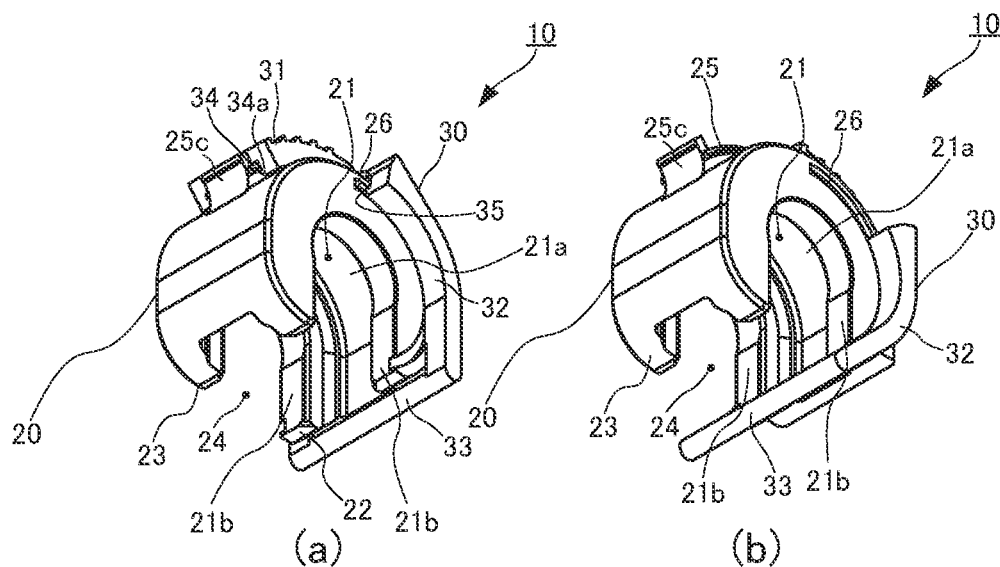
[FIG. 5]
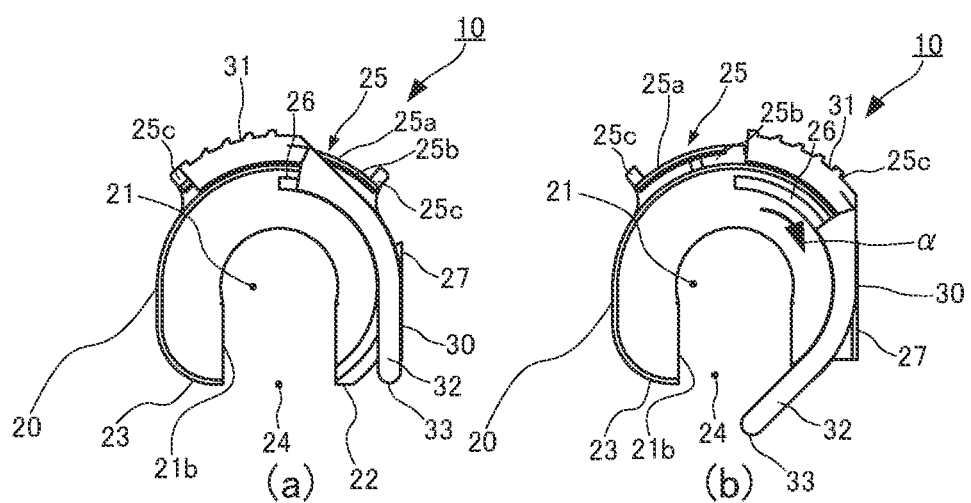

[FIG. 6]
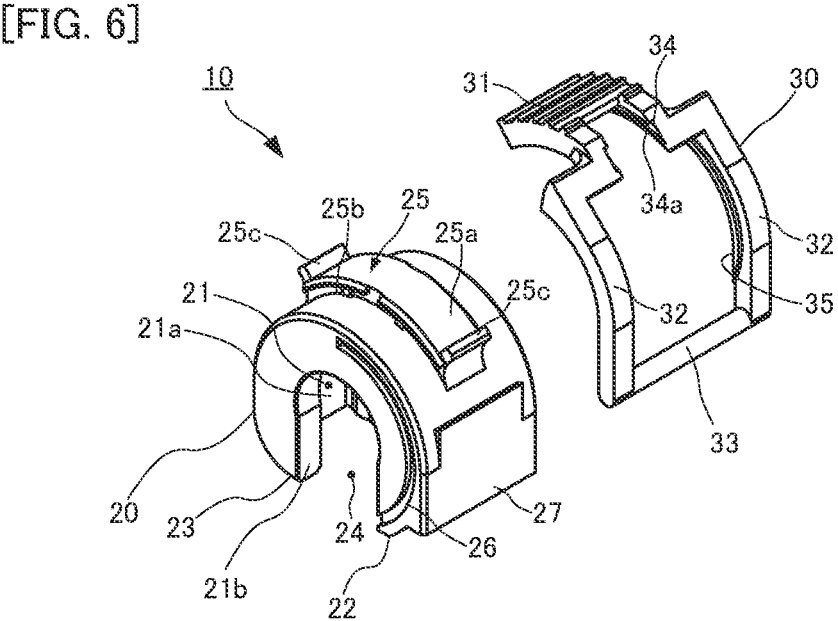
[FIG. 7]
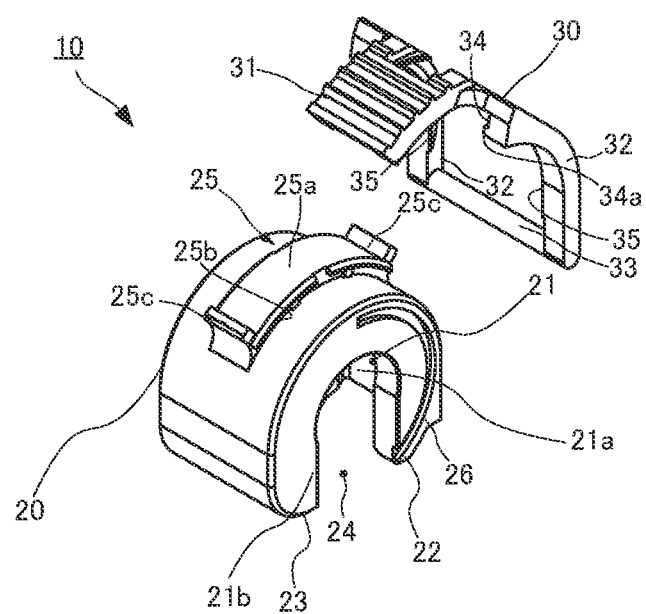

[FIG. 8]
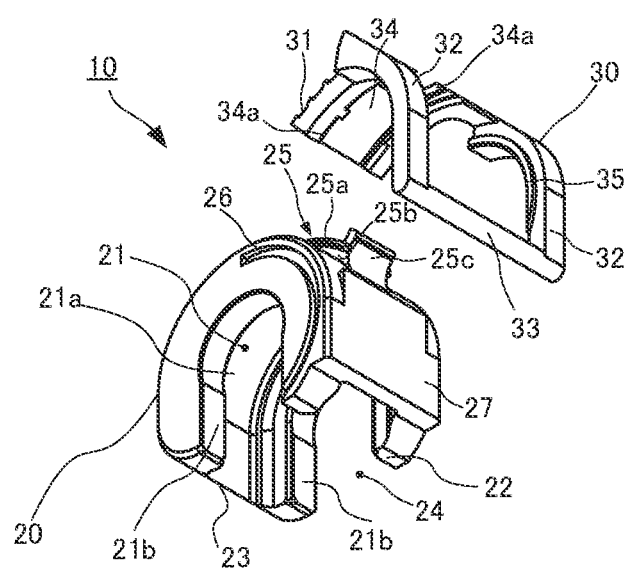

[FIG. 9]
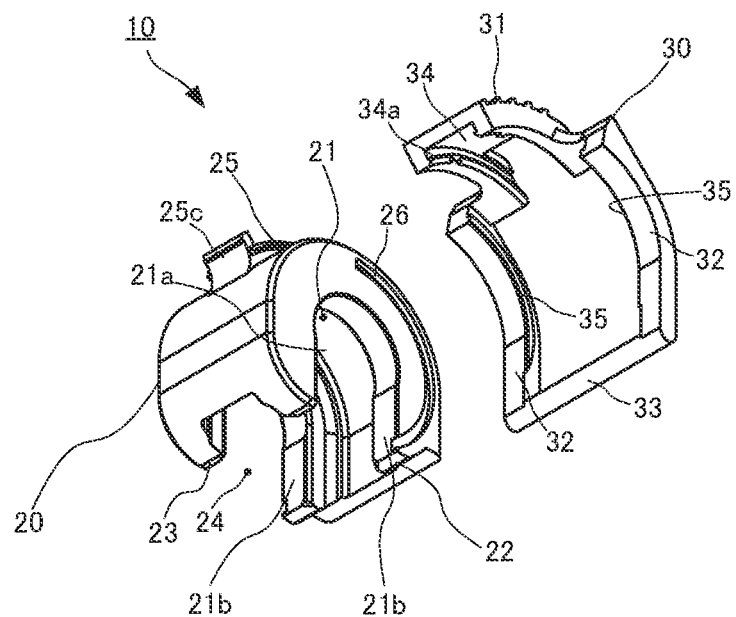
[FIG. 10]
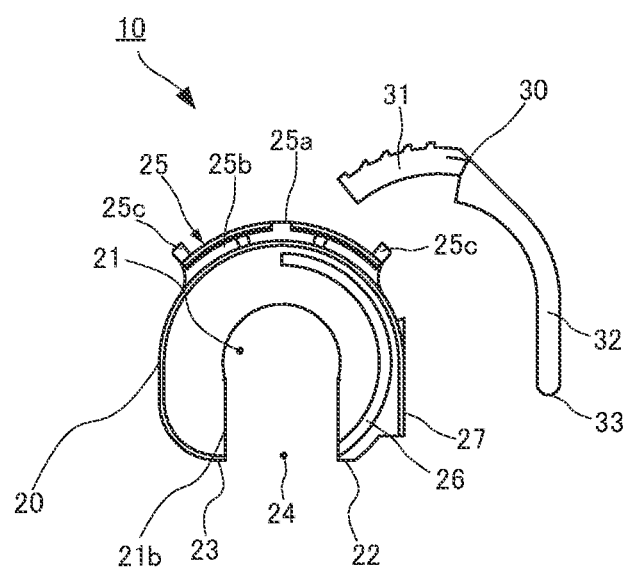

[FIG. 11]
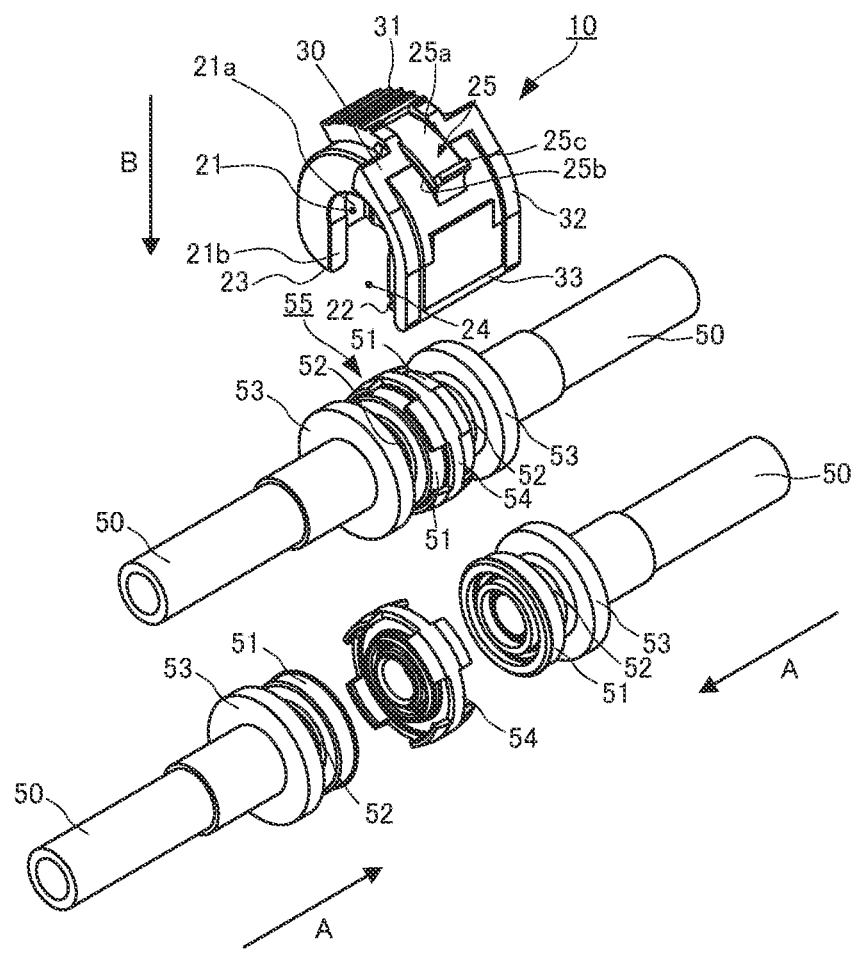

[FIG. 12]
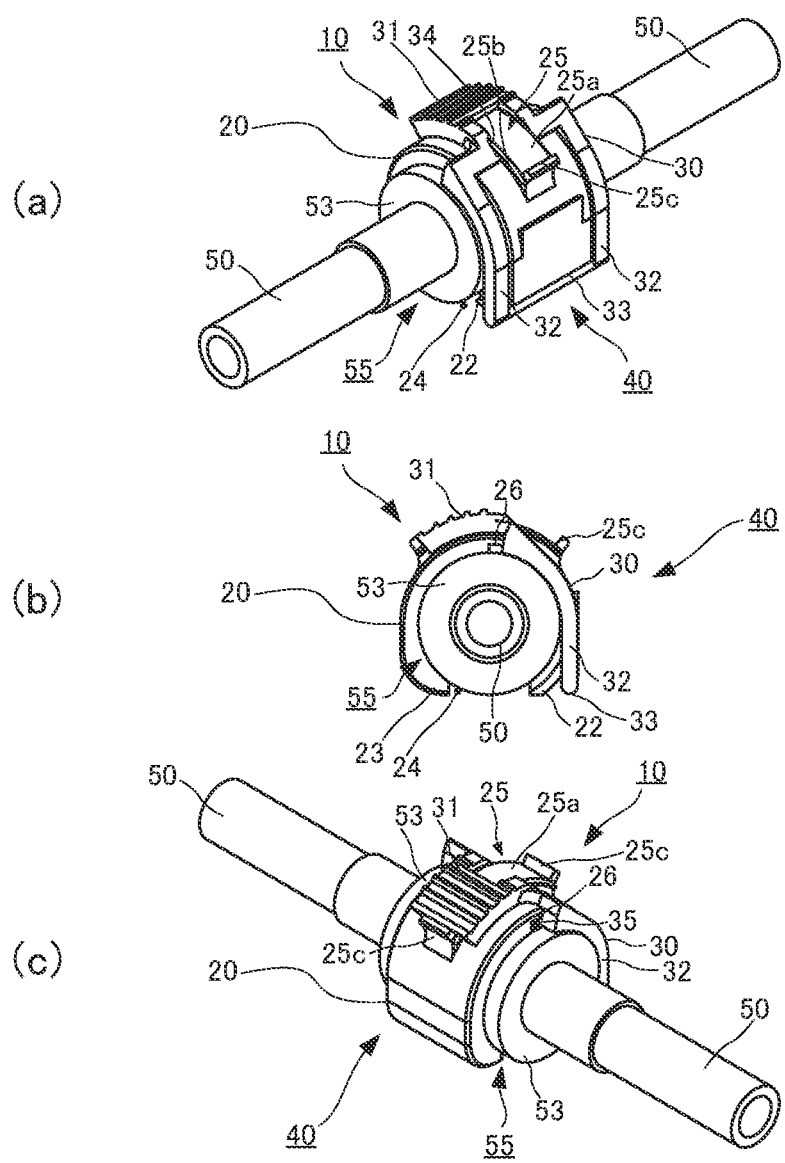

[FIG. 13]
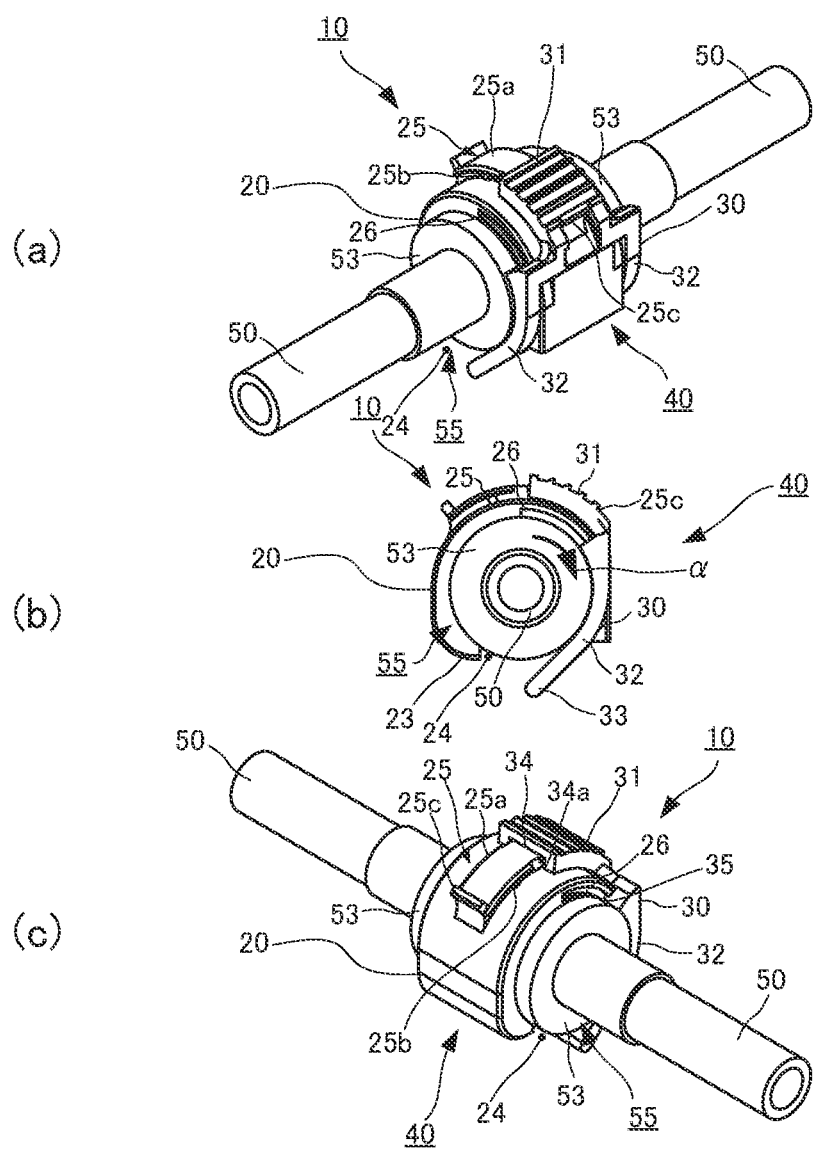

FLUID DEVICE COUPLER AND FLUID DEVICE COUPLING STRUCTURE

TECHNICAL FIELD

The present invention relates to a fluid device coupler for connecting fluid devices such as pipes and pumps, and its coupling structure. In more particular, the present invention relates to a fluid device coupler and its coupling structure that can achieve good workability while saving space without reducing sealing performance.

BACKGROUND ART

Equipment for manufacturing, cleaning, and assembling or the like in the fields of electronics such as semiconductors, pharmaceuticals, and biotechnology is provided with pipe arrangement such as tubes and joints, and various devices such as valves and pumps (hereinafter collectively referred to as "fluid device"), through which fluids such as feedstock fluid, cleaning fluid, chemical solution, and fuel fluid are flowing. A fluid device coupler (this may be referred to as mere a "coupler") is generally used to connect fluid devices to each other.

Some fluid devices are provided with a pipe having a joining port at its distal end to connect with another fluid device. In this type of fluid device, two joining ports are butted together with an annular seal member interposed therebetween to produce a connecting portion. Then, fluid devices are connected by mounting a coupler on the connecting portion For example, Patent Document 1 discloses a coupler comprising a pair of semi-circular arc-shaped coupling segments hinged together. The coupling segments are placed on the connecting portion in their open state and then closed to clamp the connecting portion, thus completing the coupling to the connecting portion of the fluid devices.

PRIOR ART DOCUMENT(S)

Patent Document

Patent Document 1: Japanese Patent Application Publication 2021-25608

SUMMARY OF THE INVENTION

Problems to be Solved by the Invention

When the coupler is mounted on a connecting portion, one of the coupling segments is required to open relative to the other of the coupling segments around an axis of the hinge. In this opened state, the coupler is brought closer to the connecting portion (FIG. 4(b) in Patent Document 1). However, installing the coupler is not easy when it is hard to ensure a space to install, such as when fluid devices are close to each other or when it is hard to reach the connecting portion.

An object of the present invention is to provide a fluid device coupler and a fluid device coupling structure that can save space and achieve good workability without degrading sealing performance.

Means to Solve the Problems

A fluid device coupler of the present invention is a fluid device coupler for coupling a connecting portion of opposed fluid devices, the fluid device coupler comprising
a coupling base having a depressed part wherein at least a part thereof is curved in an arc shape, a first end edge and a second end edge that are continuous with an inner surface of the depressed part, and an opening portion formed between the first end edge and the second end edge to allow insertion of the connecting portion of the fluid devices, and
a blockage member protrudable from the first end edge side toward the second end edge side and retractable from the second end edge side toward the first end edge side,
the blockage member being configured to shut the opening portion of the coupling base in the state protruding from the first end edge side.

The blockage member is slidably disposed on the coupling base.

The coupling base and the blockage member may provide a locking mechanism capable of positioning the blockage member relative to the coupling base in the state where the blockage member protrudes from the first end edge side.

The blockage member may be configured to reach the second end edge side at its distal end in the most protruded state from the first end edge side.

The blockage member may be configured not to reach the second end edge side at its distal end in the most protruded state from the first end edge side.

The fluid device has a joining port at its distal end and is configured to produce the connecting portion by abutting a pair of the fluid devices with an annular seal member interposed between the pair of the fluid devices,
the coupling base is formed in its depressed part with a groove to fit the joining port and the seal member thereinto.

The blockage member is configured to be protrudable and retractable relative to the opening portion in the state where the coupling base is properly mounted on the connecting portion of the fluid devices.

A fluid device coupler structure according to the present invention comprises the above-mentioned fluid device coupler mounted on the connecting portion of the fluid devices.

Effects of the Invention

In operation, the opening portion of the fluid device coupler is placed on a connecting portion of opposed fluid devices in the state where the blockage member is retracted toward the first end edge side. The opening portion is then shut in at least a portion by protruding the blockage member toward the second end edge side, whereby the coupler can be mounted on the connecting portion and does not fall off the connecting portion. Accordingly, a fluid device connection structure wherein the coupler connects the connection portion of the fluid devices can be provided.

The fluid device coupler of the present invention is not required to open the coupling segments as in the prior art, and can be mounted on the connecting portion simply by bringing the opening portion directly close to the connecting portion, and then protruding the blockage member. Therefore, even if the space in the equipment is not ensured, the coupler can be easily mounted on the connecting portion.

BRIEF DESCRIPTION OF THE DRAWINGS

FIG. 1 is a perspective view of a front side of a fluid device coupler according to an embodiment of the present invention, in which (a) shows an opened state and (b) shows a closed state.

FIG. 2 is a perspective view of a rea side of the coupler, in which (a) shows an opened state and (b) shows a closed state.

FIG. 3 is a perspective view of the front side of the coupler, as seen from below, in which (a) shows an opened state and (b) shows a closed state.

FIG. 4 is a perspective view of the rear side of the coupler, as seen from below, in which (a) shows an opened state and (b) shows a closed state.

FIG. 5 is a left side view of the coupler, wherein (a) shows the opened state and (b) shows the closed state.

FIG. 6 is an exploded perspective view showing the front side of the coupler.

FIG. 7 is an exploded perspective view showing the rear side of the coupler.

FIG. 8 is an exploded perspective view of the front side of the coupler, when seen from below.

FIG. 9 is an exploded perspective view of the rear side of the coupler, when seen from below.

FIG. 10 is an exploded view of the left side of the coupler.

FIG. 11 is an explanatory diagram showing a connecting procedure of the fluid device and the coupler.

FIG. 12 shows the state where the coupler is mounted on the connecting portion of the fluid devices, wherein (a) is a front-side perspective view, (b) a left side view, and (c) a rear-side perspective view.

FIG. 13 shows the state where the coupler is mounted on the connecting portion of the fluid devices and the blockage member is protruded, wherein (a) is a front-side perspective view, (b) a left side view, and (c) a rear-side perspective view.

MODE FOR CARRYING OUT THE INVENTION

Hereinafter, a fluid device coupler 10 and a fluid device coupling structure 40 according to an embodiment of the present invention will be described with reference to the drawings.

FIGS. 1 to 5 are perspective and other views of the coupler 10 when seen from various angles, and FIGS. 6 to 10 are perspective and other views showing the coupler 10 in an exploded form. In FIGS. 1 to 5, (a) shows the opened state where the blockage member 30 is retracted, and (b) shows the closed state where the blockage member 30 is protruded.

As illustrated, the coupler 10 comprises a coupling base 20 having a depressed part 21 curved in an arc shape and a blockage member 30 protrudably and retractably attached to the coupling base 20. For example, the blockage member 30 is slidably attached to the coupling base 20.

The coupling base 20 and the blockage member 30 can be made of a material such as a fluoro resin material, which is excellent in thermal meltability, corrosion resistance, chemical resistance stability, and the like. The material suitable for this type of fluoro resin material is tetrafluoroethylene-perfluoroalkyl vinyl ether copolymer (PFA). Other fluoro resin material includes polyvinylidene fluoride (PVDF), tetrafluoroethylene-hexafluoropropylene copolymer (FEP), Examples include tetrafluoroethylene-hexafluoropropylene-vinylidene fluoride terpolymer, etc. In addition, polyphenylene sulfide (PPS) can be exemplified as other material.

In a specific embodiment, the coupling base 20 has a depressed part 21 formed at least in part curved in an arc shape. The coupling base 20 has a first end edge 22 and a second end edge 23 that are continuous with the depressed part 21. Formed between the first end edge 22 and the second end edge 23 is an opening portion 24 that is opened in the radial direction.

The coupling base 20 may be made in a substantially C-shaped form, wherein the depressed part 21 is curved in an arc shape (semi-circle) on its bottom side, and the first end edge 22 and the second end edge 23 extend substantially in parallel from the front edge of the arc. An inner surface of the depressed part 21 of the coupling base 20 is formed in a substantially U-shape.

As best shown in FIGS. 3 and 4, the depressed part 21 of the coupling base 20 includes a groove 21a and groove walls 21b, 21b protruding inwardly from each side of the groove 21a. The groove 21a has an arc shape into which a connecting portion 55 (FIGS. 11 to 13) of opposed fluid devices 50 is fitted, which will be described later. The groove 21a has a curvature radius that is substantially the same as an outer diameter of a seal member 54 of the connecting portion 55 and has a width that is substantially the same as the width of the connecting portion 55 (overlap thickness of two joining ports 51, 51 and seal member 54). Further, each of the groove walls 21b, 21b is an arc shape into which an intermediate portion 52 (described later) is fitted, and has a curvature radius that is substantially the same as the outer diameter of the intermediate portion 52. The coupling base 20 clamps the joining ports 51, 51 of the connecting portion 55 between the groove walls 21b, 21b, and holds the fluid devices 50, 50 in a coupled state.

The coupling base 20 has an opening portion 24 into which the connecting portion 55 of the fluid devices 50, 50 is inserted. The width to be opened by the opening 24 is determined to the size of the connecting portion 55. In particular, the distance between the groove 21a of the first end edge 22 and the groove 21a of the second end edge 23 is substantially the same as the outer diameter of the seal member 54 (FIG. 11) of the connecting portion 55, and the curvature radius of the groove wall 21b is substantially the same as the diameter of the intermediate portion 52 of the connecting portion 55.

The coupling base 20 is provided on the outer peripheral surface and/or the side surface thereof with a mechanism for supporting the blockage member 30 protrudably and retractably. The blockage member 30 is protruded and retracted, for example, in a slide form. The sliding structure on the side of the coupling base 20 in the present embodiment comprises a guide rail 25 provided on the curved portion of the outer circumference of the coupling base 20. As shown in FIGS. 2, 4, 6, 7, and other views, the guide rail 25 has a rail surface 25a curved along the circumferential direction of the coupling base 20 with a predetermined width. The guide rail 25 is formed between the outer peripheral surface and the rail surface 25a of the coupling base 20 with a rail groove 25b in a depressed form. The rail surface 25a is provided at the proximal and the distal ends in the circumferential direction with stoppers 25c, 25c to determine the slidable range of the blockage member 30.

On the side surface of the coupling base 20, a guide groove 26 as a sliding structure for slidably guiding the blockage member 30 is depressed in an arc shape from near the top of the curved portion of coupling base 20 toward the first end edge 22.

As the guide groove 26 is formed closer to the inner diameter side of the coupling base 20 than the guide rail 25, the curvature radius of the guide groove 26 is smaller than the curvature radius of the guide rail 25. This configuration realizes a locking mechanism for the coupling base 20 and the blockage member 30, which will be described later.

In addition, the coupling base 20 may be provided on its front side with a nameplate 27 on which product number, product name, size, etc., can be affixed.

The blockage member 30 to be attached to the coupling base 20 can be protrudable from the side of the first end edge 22 toward the side of the second end edge side 23 and retractable from the side of the second end edge 23 toward the side of the first end edge 22. The blockage member 30 is configured to shut a part or an entire of the opening portion 24 in the state where the coupling base 20 is mounted on the connection portion 55 of the fluid devices 50, 50, thus preventing the coupler 10 from falling off.

The blockage member 30 is provided on the proximal end side thereof with an operation part 31 operable by the user with a thumb or the like. The operation part 31 may have a knurled part to prevent it from slipping.

In the illustrated embodiment, the blockage member 30 is made in the form of a frame. In the embodiment, the blockage member 30 has side frames 32, 32 provided in wide intervals from the operation part 31 toward the distal end side. The side frames 32, 32 are connected to a front end frame 33 at their respective distal ends. In the illustrated embodiment, the front end frame 33 of the blockage member 30 is positioned flush with or not beyond the first end edge 22 when the blockage member 30 is most retracted, as shown in (a) of FIGS. 1 to 5. When the blockage member 30 is most protruded, the front end frame 33 is positioned almost central to the opening portion 24, as shown in (b) of FIGS. 1 to 5, or reaches or approaches the side of the second end edge 23 from the central portion although not illustrated. The length of the side frames 32, 32 is determined to practice this embodiment.

In the present embodiment, the side frames 32, 32 extend outside the coupling base 20, as shown in FIG. 1 and other views. When the blockage member 30 is projected, the side frames 32, 32 move along the outer peripheral surface of a flange 53 of the connecting portion 55 and abut the flange 53, preventing the coupler 10 from falling off, as explained later with reference to FIG. 13.

The operation part 31 is provided on the back side thereof with a sliding structure that slidably engages with the guide rail 25 of the coupling base 20. The illustrated sliding structure comprises a slide groove 34 fittable into the guide rail 25. The slide groove 34 has a groove bottom slidable on the rail surface 25a of the guide rail 25, and has a slide protrusion 34a extending inwardly and fittable into the rail groove 25b of the guide rail 25.

The distance between the side frames 32, 32 of the blockage member 30 is such that the inner surfaces of the side frames 32, 32 clamp the side surface of the coupling base 20. The side frames 32, 32 are formed on their inner side surfaces with slide ridges 35, 35 projecting therefrom and fittable into the guide groove 26 of the coupling base 20.

The blockage member 30 is attached to the coupling base 20 to form the coupler 10. In the present embodiment, the slide groove 34 of the blockage member 30 is fitted into the guide rail 25 of the coupling base 20. As the guide rail 25 has the rail groove 25b on the inner peripheral side of the rail surface 25a, the blockage member 30 can be mounted on the guide rail 25 like holding the guide rail 25 by placing the groove bottom of the slide groove 34 into contact with the rail surface 25a and fitting the slide protrusion 34a into the rail groove 25b. Thus, the blockage member 30 can be slidably and unfallably mounted on the coupling base 20.

In addition, the slide ridge 35 of the blockage member 30 is fitted into the guide groove 26 of the coupling base 20.

A sliding structure of the blockage member 30 is such that on the proximal end side where the operation part 31 is provided, the slide groove 34 fits into the guide rail 25 of the coupling base 20, and on the distal end side, the slide ridges 35, 35 of the side frames 32, 32 fit into the guide groove 26 of the coupling base 20. With these two sliding structures, the blockage member 30 is slidably attached to the coupling base 20 without being away in the radial direction.

As shown in FIG. 11, the fluid device 50 to be connected by the coupler 10 having a configuration as described above has a joining port 51 at its distal end and is in the form of a pipe through which a fluid can flow. A connecting portion 55 is made by contacting fluid devices 50, 50 to each other, as shown by the direction of arrow A in FIG. 11, with an annular seal member 54 interposed between the joining ports 51, 51. The joining port 51 is formed at its rear part with a flange 53. Interposed between the joining port 51 and the flange 53 is a cylindrical intermediate portion 52. The flange 53 is a member to be pressed by a jig (not shown) when the joining ports 51 and 51 are pressed against the seal member 54. It is noted that the configuration of the connecting portion 55 is only an example, and other structures may be used.

As shown in (a) of FIGS. 1 to 5 and FIG. 11, the coupler 10 is operated to retract the blockage member 30 and move the opening portion 24 to approach the connecting portion 55 of the fluid device 50 in the state where the opening portion is not shut (arrow B in FIG. 11). Since the retraction of the blockage member 30 is restricted by contacting with the stopper 25c of the guide rail 25, the blockage member 30 does not fall off from the guide rail 25. When approaching the connecting portion 55, the coupler 10 itself is not required to bring the coupling segments in an open state, unlike the prior art. It is therefore able to easily access the fluid device 50 even if the space cannot be secured in the equipment. In addition, when the blockage member 30 is in a retracted state, the coupler 10 is hard to move due to friction with the coupling base 20, so the opening portion 24 is prevented from moving and remains not shut. Therefore, the coupler 10 can be brought close to the connection portion 55 of the fluid device 50 while holding the coupler 10 with one hand. In particular, when the jig is operated with one hand to work while keeping the flanges 53, 53 of the connecting portion 55 pressed down, the coupler 10 of the present invention is excellent in operability in that it can be grasped and mounted with one hand.

Then, the opening portion 24 of the coupling base 20 of the coupler 10 is fitted into the connecting portion 55, as shown in FIG. 12. As a result, the connection portion 55 (joining ports 51, 51 and seal member 54) is housed in the groove 21a of the coupling base 20. The joining ports 51, 51 on both sides are held by the inner surfaces of the groove walls 21b, 21b. So, the connecting portion 55 is connected by the coupling base 20 without being separated.

From this state, the user pushes down the operation part 31 of the blockage member 30 with the thumb to project the blockage member 30 toward the opening portion 24, as shown in FIG. 13 and each (b) of FIGS. 1 to 5. The blockage member 30 slides relative to the coupling base 20 in the direction indicated by the arrow a in FIG. 5(b) and FIG. 13(b) so that the front end frame 33 and the side frames 32, 32 partially extend into the opening portion 24. As best shown in FIG. 13(b), the opening portion 24 is shut at least in part by the blockage member 30. As the opened width of the opening portion 24 becomes smaller than the diameter of the connecting portion 55, the coupler 10 does not fall off from the connecting portion 55. Thus, the connecting structure 40 having the fluid devices 50, 50 connected to each other, can be achieved. In addition, the side frames 32, 32 of the blockage member 30 slide along the outer peripheral surface of the flange 53 of the connecting portion 55, and shuts the opening portion 24 while pressing the flange 53. This configuration also prevents the coupler 10 from falling off.

The blockage member 30 can be operated only by sliding the operation part 31 with the thumb, and is excellent in workability.

The position protrudable by the blockage member 30 is restricted by the stopper 25c of the guide rail 25, so the blockage member 30 does not fall out of the guide rail 25 when it is pushed in.

In this embodiment, the guide groove 26 of the coupling base 20 is provided on the inner diameter side of the coupling base 20 than the guide rail 25. That is, the curvature radius of the guide groove 26 is smaller than the curvature radius of the rail surface 25a When the blockage member 30 is slid toward the opening portion 24 side, the slide ridge 35 that slides along the guide groove 26 and the slide groove 34 that slides on the rail surface 25a of the guide rail 25 move on different radii of curvature. As a result, the slide ridge 35 is pressed against the outer diameter side of the guide groove 26, and the slide groove 34 is pressed against the rail surface 25a located on the inner diameter side, producing a locking mechanism wherein the blockage member 30 can be positioned in its projecting state relative to the coupling base 20.

As the blockage member 30 is positioned in its projecting state relative to the coupling base 20 by the locking mechanism described above, the blockage member 30 does not retract even if the fluid device 50 is subjected to vibration or the like, thus preventing the coupler 10 from falling off.

According to this embodiment, the blockage member 30 is configured to slide along the outer peripheral surface of the flange 53 by pushing down the operation part 31. Therefore, if the operation part 31 is pushed down in the case where the coupler 10 is not properly mounted on the connection portion 55, such as in the case where the connection portion 55 is not completely fitted in the depressed part 21 of the coupling base 20, the inner surfaces of the side frames 32, 32 come into contact with the connecting portion 55, i.e., the outer peripheral surface of the flange 53 in this embodiment, resulting in that the blockage member 30 is pushed out toward the outer diameter direction. So, the slide ridge 35 of the blockage member 30 is pressed against the outer diameter side of the guide groove 26, the side frames 32, 32 are tensioned, and the blockage member 30 is prevented from moving. In addition, if not fully fitted in the opening portion 24, the front end frame 33 of the blockage member 30 contacts the flange 53 when the blockage member 30 is pushed out, resulting in that the blockage member 30 is prevented from moving. Thus, the blockage member 30 in the present embodiment is configured to protrude and retract relative to the opening portion 24 only when the coupling base 20 is properly mounted on the connecting portion 55 of the fluid devices 50. In other words, sliding the blockage member 30 also confirms that the coupler 10 is properly mounted on the connecting portion 55.

As described above, the coupler 10 of the present invention comprises the blockage member 30 that is protrudable and retractable relative to the opening portion 24 of the coupling base 20. So, the user can operate the coupler 10 with one hand so that good workability is achieved even in a small space. In addition, the coupler 10 holds the connecting portion 55 in a clamped state without falling off from the connecting portion 55, providing an excellent sealing property and preventing fluid leakage from the connecting portion 55.

A removal of the coupler 10 of the present invention from the connecting portion 55 is opposite to the above-mentioned mounting procedure. The coupler 10 can be unloaded from the connecting portion 55 by retracting the blockage member 30 to fully open the opening portion 24 of the coupling base 20.

The above description is intended to explain the invention and should not be construed as limiting or restricting the scope of the invention as recited in the claims. The present invention is not limited to the above-mentioned examples, and various modifications can be made within the technical scope recited in the claims.

For example, the shapes of the coupling base 20 and the blockage member 30 are not limited to the above embodiments. In particular, the blockage member 30 shown in the embodiments is in the form of a frame but may be in the form of an arc-shaped flat plate.

In the above embodiment, the blockage member 30 does not reach the second end edge 23 in its most protruding state but may be configured to reach the second end edge 23 in its distal end edge by forming the length of the blockage member 30 longer in the circumferential direction. In this case, the blockage member 30 may be provided at its distal end with a claw or a dent, and the second end edge 23 may be provided with a dent or claw engageable with the blockage member 30. So, the blockage member 30 engages with the second end edge 23 in the state where the blockage member 30 protrudes from the second end edge 23, providing a lock mechanism.

DESCRIPTION OF REFERENCE SIGNS 10 fluid device coupler
20 coupling base
21 depressed part
22 first end edge
23 second end edge
24 opening portion
30 blockage member
40 fluid device connection structure
50 fluid device
55 connecting portion

The invention claimed is:
1. A fluid device coupler for coupling a connecting portion of opposed fluid devices, the fluid device coupler comprising:
    a coupling base having a depressed part with at least a part thereof curved in an arc shape, a first end edge side and a second end edge side that are continuous with an inner surface of the depressed part, and an opening portion formed between the first end edge side and the second end edge side to allow insertion of the connecting portion of the fluid devices,
    a blockage member protrudable in a circumferential direction from the first end edge side toward the second end edge side and retractable in a circumferential direction from the second end edge side toward the first end edge side, and
    a sliding structure configured to slidably move the blockage member toward the second end edge side of the coupling base without changing a distance radially from the coupling base.

2. The fluid device coupler according to claim 1 wherein the blockage member is slidably disposed on the coupling base.

3. The fluid device coupler according to claim 2 wherein the coupling base and the blockage member provide a locking mechanism capable of positioning the blockage member relative to the coupling base in the state where the blockage member protrudes from the first end edge side.

4. The fluid device coupler according to claim 3 wherein a distal end of the blockage member is configured not to reach the second end edge side of the coupling base in the most protruded state from the first end edge side of the coupling device.

5. The fluid device coupler according to claim 4 wherein each fluid device has a joining port at a distal end and is configured to provide the connecting portion by abutting the fluid devices with an annular seal member interposed between the joining ports, and
a groove is formed in the depressed part of the coupling base to fit the joining ports and the seal member thereinto.

6. The fluid device coupler according to claim 4 wherein the blockage member is configured to be protrudable and retractable relative to the opening portion in a state where the coupling base is properly mounted on the connecting portion of the fluid devices.

7. The fluid device coupler according to claim 2 wherein the blockage member is configured to move towards the second end edge side of the coupling base.

8. The fluid device coupler according to claim 2 wherein a distal end of the blockage member is configured not to reach the second end edge side of the coupling base in the most protruded state from the first end edge side of the coupling device.

9. The fluid device coupler according to claim 8 wherein each fluid device has a joining port at a distal end and is configured to provide the connecting portion by abutting the fluid devices with an annular seal member interposed between the joining ports, and
a groove is formed in the depressed part of the coupling base to fit the joining ports and the seal member thereinto.

10. The fluid device coupler according to claim 8 wherein the blockage member is configured to be protrudable and retractable relative to the opening portion in a state where the coupling base is properly mounted on the connecting portion of the fluid devices.

11. The fluid device coupler according to claim 2 wherein each fluid device has a joining port at a distal end and is configured to provide the connecting portion by abutting the fluid devices with an annular seal member interposed between the joining ports, and
a groove is formed in the depressed part of the coupling base to fit the joining ports and the seal member thereinto.

12. The fluid device coupler according to claim 2 wherein the blockage member is configured to be protrudable and retractable relative to the opening portion in a state where the coupling base is properly mounted on the connecting portion of the fluid devices.

13. The fluid device coupler according to claim 1 wherein a distal end of the blockage member is configured not to reach the second end edge side of the coupling base in the most protruded state from the first end edge side of the coupling device.

14. The fluid device coupler according to claim 13 wherein each fluid device has a joining port at a distal end and is configured to provide the connecting portion by abutting the fluid devices with an annular seal member interposed between the joining ports, and
a groove is formed in the depressed part of the coupling base to fit the joining ports and the seal member thereinto.

15. The fluid device coupler according to claim 13 wherein the blockage member is configured to be protrudable and retractable relative to the opening portion in a state where the coupling base is properly mounted on the connecting portion of the fluid devices.

16. The fluid device coupler according to claim 1 wherein the sliding structure comprises
an arc-shaped guide rail provided on an outer peripheral surface of the coupling base, and
a slide groove formed in an inner peripheral surface of the blockage member, wherein
the arc-shaped guide rail can be fit into the slide groove of the blockage member.

17. The fluid device coupler according to claim 1 wherein the sliding structure comprises
a pair of arc-shaped guide grooves formed in each outer side surface of the coupling base, and
a pair of slide ridges provided on each inner side surface of the blockage member, wherein the pair of slide ridges can be fit into the pair of arc-shaped guide grooves of the coupling base.

18. A fluid device coupler structure wherein the fluid device coupler according to claim 2 is mounted on the connecting portion of the fluid devices.

19. A fluid device coupler structure wherein the fluid device coupler according to claim 13 is mounted on the connecting portion of the fluid devices.

20. A fluid device coupler structure wherein the fluid device coupler according to claim 8 is mounted on the connecting portion of the fluid devices.

21. A fluid device coupler structure wherein the fluid device coupler according to claim 4 is mounted on the connecting portion of the fluid devices.

* * * * *